(12) United States Patent
Tokita et al.

(10) Patent No.: US 8,338,039 B2
(45) Date of Patent: Dec. 25, 2012

(54) FUEL CELL

(75) Inventors: Yuichi Tokita, Kanagawa (JP); Hideki Sakai, Kanagawa (JP); Hideyuki Kumita, Kanagawa (JP); Ryuhei Matsumoto, Kanagawa (JP); Hiroki Mita, Kanagawa (JP); Taiki Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 12/941,662

(22) Filed: Nov. 8, 2010

(65) Prior Publication Data

US 2011/0143223 A1 Jun. 16, 2011

(30) Foreign Application Priority Data

Dec. 10, 2009 (JP) ................ P2009-280662

(51) Int. Cl.
*H01M 8/16* (2006.01)

(52) U.S. Cl. ...................................... 429/401; 429/400
(58) Field of Classification Search .................. 429/401
See application file for complete search history.

(56) References Cited

U.S. PATENT DOCUMENTS

| 7,824,574 B2 * | 11/2010 | White et al. .................. 252/373 |
| 2007/0248850 A1 * | 10/2007 | Heller ............................. 429/13 |
| 2011/0143225 A1 * | 6/2011 | Nakagawa et al. ........... 429/401 |

FOREIGN PATENT DOCUMENTS

JP 2008-059800 3/2008

* cited by examiner

*Primary Examiner* — John S Maples
(74) *Attorney, Agent, or Firm* — K&L Gates LLP

(57) ABSTRACT

A fuel cell is provided. The fuel cell includes at least one of a plant essential oil and a plant essential oil ingredient in an effective amount so as to function as a biological repellent.

10 Claims, 2 Drawing Sheets

FUEL CELL

CROSS REFERENCES TO RELATED APPLICATIONS

The present application claims priority to Japanese Priority Patent Application JP 2009-280662 filed in the Japan Patent Office on Dec. 10, 2009, the entire content of which is hereby incorporated by reference.

BACKGROUND

The present application relates to a fuel cell and, more particularly, to a biofuel cell capable of repelling living organisms by means of a plant essential oil given thereto.

There have recently been developed biofuel cells which have an oxidoreductase (as a catalyst) immobilized on at least either of the anode or cathode (biofuel cell will be referred to simply as "fuel cell" hereinafter). The fuel cell efficiently produces electrons from fuels such as glucose and ethanol which are not readily reacted by ordinary industrial catalysts, and it also has high capacity. Moreover, it offers high safety attributable to the fuel which is one of nutrient sources for human beings.

There is disclosed in Japanese Patent Laid-open No. 2008-59800 (hereinafter referred to as Patent Document 1) an example of the fuel cell which employs a compound useful as a biological nutrient source for the substrate of the oxidoreductase. This compound functions as the fuel (see Claim 5 in the document). Typical compounds listed in the document include alcohol, sugar, and aldehyde (see Claim 6 in the document).

SUMMARY

The fuel cell disclosed in Patent Document 1 mentioned above, which employs alcohol, sugar, aldehyde, or the like as the fuel, provides high safety.

However, the fuel cell like this has the disadvantage of attracting insects once the fuel solution leaks from it because the fuel solution is a nutrient source for not only human beings but also any other living organisms such as insects, bacteria, and fungi. Insects, including pests such as flies and cockroaches, swarming on the leaked fuel solution not only deteriorate the performance of the fuel cell but also impair the appearance of the fuel cell and pose problems with hygiene. The same problems as above will arise when bacteria and fungi grow on the leaked fuel solution.

It is desirable to provide a fuel cell which prevents insects from swarming over it even when the leakage of fuel solution should occur.

In an embodiment, a fuel cell is provided. The fuel cell includes at least one of a plant essential oil and a plant essential oil ingredient in an effective amount so as to function as a biological repellent.

In an embodiment, the at least one of the plant essential oil and the plant essential oil ingredient does not produce an adverse effect on enzyme activity and fuel cell performance.

In an embodiment, the at least one of the plant essential oil and the plant essential oil ingredient produces higher enzyme activity and fuel cell performance as compared to DEET.

In an embodiment, the plant essential oil is selected from the from group consisting of orange flower oil, geranium oil, thyme white oil, thyme red oil, nutmeg oil, patchouli oil, palmarose oil, bitter orange oil, lemongrass oil, fragrant olive oil, sesame oil, cinnamon leaf oil, cinnamon bark, cassia, celery seed oil, tolubalsam, Peru balsam, oak moss, sandalwood oil, spearmint oil, laurel oil, garlic oil, coconut oil, dill oil, *Anethum graveolens* oil, birch oil, penyroyal oil, Nimes oil, vetiver oil, elemi oil, extract from seeds of *Xylopia aethiopica*, extract from *Wiskstroemia retusa* A. Gray, extract from seeds of *Aframomum melegueta*, and combinations thereof.

In an embodiment, the plant essential oil ingredient includes at least one of terpenes including sesquiterpenes including elemol, β-eudesmol, and vetiselinenol; cinnamic amide derivatives isolated from seed extract of *Xylopia aethiopica* and synthetic analogs thereof, aflatoxin and derivatives thereof isolated from extract of *Wiskstroemia retusa* A. Gray, and ketones isolated from seed extract of *Aframomum melegueta* and synthetic analogs thereof.

In an embodiment, the fuel cell includes a fuel that contains the at least one of the plant essential oil and the plant essential oil ingredient.

In an embodiment, the amount of the at least one of the plant essential oil and the plant essential oil ingredient in the fuel is 1% or less.

In an embodiment, the fuel includes a biological nutrient source.

In an embodiment, wherein the at least one of the plant essential oil and the plant essential oil ingredient is applied to at least a portion of an enclosure of the fuel cell.

In an embodiment, the fuel cell includes a fuel that includes a biological nutrient source.

The term "plant essential oil" used in the present application denotes an organic compound which is extracted from any plant and which contains volatile aromatic substances (fragrant components) and produces the action of repelling living organisms including insects but excluding human beings. The term "ingredient of plant essential oil" denotes the substance which is contained in the plant essential oil and which produces the above-mentioned action of repelling living organisms. This ingredient may contain substances as contained in natural plant essential oil as well as substances isolated or purified from essential oil. It may also contain chemically synthesized substances having the similar structure and producing the same action as mentioned above. The term "action of repelling living organisms" implies the action of repelling at least insects and additionally implies the action of preventing the proliferation of bacteria and fungi.

The term "compound useful as a biological nutrient source" denotes such compounds as sugar, alcohol, aldehyde, fat and oil, and protein, which can be nutrient sources for the survival of living organisms and can be the substrate for the oxidoreductase used in the fuel cell.

The present application provides in an embodiment a fuel cell which prevents insects from swarming over the fuel solution which might accidentally leak from the fuel cell.

Additional features and advantages are described herein, and will be apparent from the following Detailed Description and the figures.

DETAILED DESCRIPTION

Figure 1:
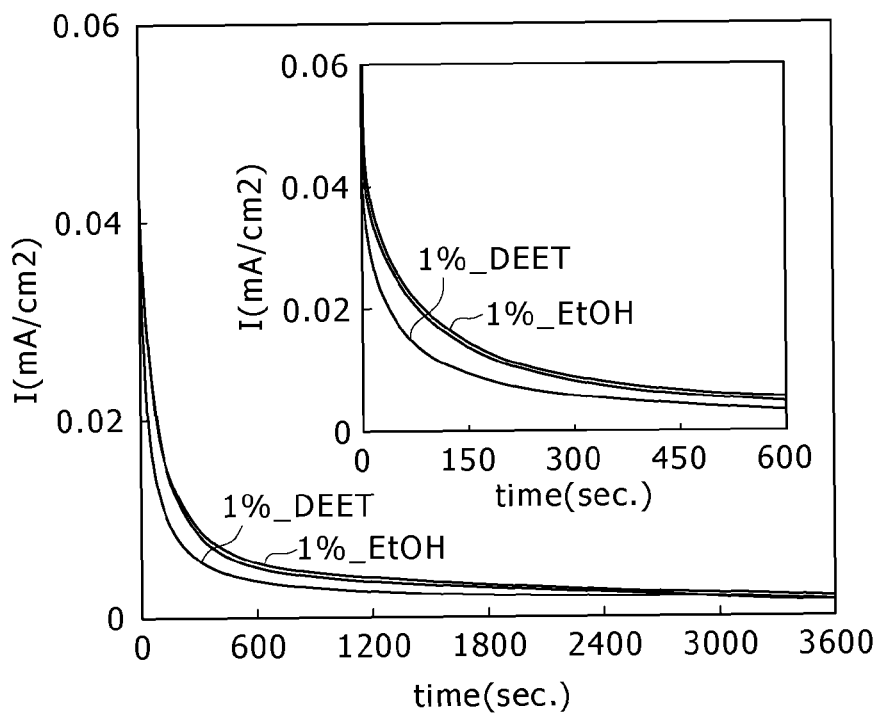
FIG. 1 is a diagram illustrating the result of measurements of the current produced by the enzymatic catalyst at the anode of the fuel cell containing DEET.

The following is a description of according to an embodiment of the present invention. The below description represents examples of the present application according to an embodiment and should not be construed to restrict the scope of the application. The description is arranged in the following order.

1. Structure of the fuel cell
  (1) Fuel cell
  (2) Electrode
    (i) Enzyme on the fuel electrode
    (ii) Enzyme on the air electrode
    (iii) Material of the electrode
  (3) Proton conductor
2. Action of repelling living organisms by essential oil
  (1) Plant essential oil
  (2) Addition of plant essential oil to fuel
  (3) Treatment of enclosure with plant essential oil
1. Structure of the Fuel Cell The fuel cell according to an embodiment employs any compound for biological nutrient sources as the fuel and also employs any enzyme capable of oxidation and reduction of such compound as the catalyst immobilized on the electrode. In addition, the fuel contains a plant essential oil and/or an ingredient thereof.

(1) Fuel Cell

The fuel used for the fuel cell according to an embodiment is any compound as nutrient sources for living organisms. Such compounds include sugar, alcohol, aldehyde, lipid, and protein, which function not only as nutrient sources for survival of living organisms but also as the substrate for the oxidoreductase to be mentioned later.

Examples of the compound that can be used as the fuel include sugars (such as glucose, fructose, and sorbose), alcohols (such as methanol, ethanol, propanol, glycerin, and polyvinyl alcohol), aldehydes (such as formaldehyde and acetaldehyde), and organic acids (such as acetic acid, formic acid, and pyruvic acid). They additionally include fats, proteins, and organic acids as intermediate products of saccharometabolism.

The fuels listed above may be used alone or in combination with one another. Preferable among the foregoing examples are glucose and alcohol because of their easy handling, widespread availability, and limited loads on environment.

(2) Electrode (i) Enzyme On the Fuel Electrode

The fuel cell according to an embodiment has the fuel electrode (anode) which has an enzyme immobilized thereon which catalyzes the oxidation reaction of the above-mentioned compound so that the anode produces electrons.

The enzyme to be immobilized on the anode is exemplified as follows.

Glucose dehydrogenase, gluconate 5-dehydrogenase, gluconate 2-dehydrogenase, alcohol dehydrogenase, aldehyde reductase, aldehyde dehydrogenase, lactate dehydrogenase, hydroxypulvate reductase, glycerate dehydrogenase, formate dehydrogenase, fructose dehydrogenase, galactose dehydrogenase, malic acid dehydrogenase, glyceraldehyde 3-phosphate dehydrogenase, lactic acid dehydrogenase, sucrose dehydrogenase, fructose dehydrogenase, sorbose dehydrogenase, pyruvate dehydrogenase, isocitrate dehydrogenase, 2-oxoglutalate dehydrogenase, succinate dehydrogenase, malate dehydrogenase, acyl-CoA-dehydrogenase, L-3-hydroxyacyl-CoA-dehydro genase, 3-hydroxypropionate dehydrogenase, and 3-hydroxybutyrate dehydrogenase.

The anode may also have, in addition to the above-mentioned oxidase, an oxidizing coenzyme and coenzyme oxidaze immobilized thereon. Examples of the oxidizing coenzyme include nicotinamide adenine dinucleotide (denoted by "NAD+" hereinafter), nicotinamide adenine dinucleotide phosphate (denoted by "NADP+" hereinafter), flavin adenine dinuclotide (denoted by "FAD+" hereinafter), and pyrrolloquinoline quinone (denoted by "PQQ2+" hereinafter). Examples of the coenzyme oxidaze include diaphorase.

Moreover, the anode may also have, in addition to the above-mentioned oxidase and oxidizing coenzyme, an electron transfer mediator immobilized thereon for smooth transfer of generated electrons to the electrode. The electron transfer mediator may be selected from a variety of materials; preferable ones are those which have the quinone skeleton or ferrocene skeleton. Preferable compounds having the quinone skeleton include those which have the naphthoquinone skeleton or anthraquinone skeleton. If necessary, those compounds having the quinone skeleton or ferrocene skeleton may be used in combination with one or more than one kind of compounds that function as the electron transfer mediator.

Those compounds having the naphthoquinone skeleton are exemplified by 2-amino-1,4-naphthoquinone (ANQ), 2-amino-3-methyl-1,4-naphthoquinone (AMNQ), 2-amino-3-carboxy-1,4-naphtho quinone (ACNQ), 2,3-diamino-1,4-naphthoquinone, 4-amino-1,2-napthoquinone, 2-hydroxy-1,4-naphthoquinone, 2-methyl-3-hydroxy-1,4-naphthoquinone, vitamin K1 (2-methyl-3-phytyl-1,4-naphthoquinone), vitamin K2 (2-farnesyl-3-methyl-1,4-naphthoquinone), and vitamin K3 (2-methyl-1,4-naphthoquinone).

Those compounds having the quinone skeleton are exemplified by anthraquinone-1-sulfonate and anthraquinone-2-sulfonate (both having the anthraquinone skeleton) and derivatives thereof.

Those compounds having the ferrocene skeleton are exemplified by vinyl ferrocene, dimethylaminomethyl ferrocene, 1,1'-bis(diphenylsulphyno)ferrocene, dimethyl ferrocene, and ferrocene monocarboxylic acid.

Additional compounds include, for example, metal complexes of ruthenium (Ru), cobalt (Co), manganese (Mn), molybdenum (Mo), chromium (Cr), osmium (Os), and iron (Fe); viologen compounds such as benzyl viologen; compounds having the nicotinamide structure; compounds having the riboflavin structure; and compounds having the nucleotide-phosphate structure.

Their typical examples are listed below.

cis-$[Ru(NH_3)_4C_{12}]^{1+/0}$, trans-$[Ru(NH_3)_4C_{12}]^{1+/0}$, $[Co(dien)_2]^{3+/2+}$, $[Mn(CN)_6]^{3-/4-}$, $[Mn(CN)_6]^{4-/5-}$, $[Mo_2O_3S(edta)]^{2-/3-}$, $[Mo_2O_2S_2(edta)]^{2-/3-}$, $[Mo_2O_4(edta)]^{2-/3-}$, $[Cr(edta)(H_2O)]^{1-/2-}$, $[Cr(CN)_6]^{3-/4-}$, methylene blue, pycocyanine, indigo-tetrasulfonate, luciferin, gallocyanine, pyocyanine, methyl apri blue, resorufin, indigo-trisulfonate, 6,8,9-trimethyl-isoalloxazine, chloraphine, indigo disulfonate, nile blue, indigocarmine, 9-phenyl-isoalloxazine, thioglycolic acid, 2-amino-N-methyl phenazinemethosulfate, azure A, indigo-monosulfonate, anthraquinone-1,5-disulfonate, alloxazine, brilliant alizarin blue, crystal violet, patent blue, 9-methyl-isoalloxazine, cibachron blue, phenyl red, anthraquinone-2,6-disulfonate, neutral blue, bromphenol blue, anthraquinone-2,7-disulfonate, quinoline yellow, riboflavin, flavin mononucleotide (FMN), flavin adenine dinucleotide (FAD), phenosafranin, lipoamide, safranine T, lipoic acid, indulin scarlet, 4-aminoacridine, acridine, nicotinamide adenine dinucleotide (NAD), nicotinamide adenine dinucleotide phosphate (NADP), neutral red, cysteine, benzyl viologen (2+/1+), 3-aminoacridine, 1-aminoacridine, methyl viologen (2+/1+), 2-aminoacridine, 2,8-diaminoacridine, and 5-aminoacridine. Incidentally, the symbols "dien" and "edta" used in the foregoing formulas denote respectively diethylenetriamine and ethylenediaminetetraacetate tetraanion.

(ii) Enzyme On the Air Electrode

The fuel cell according to an embodiment has the air electrode (cathode) which has an enzyme immobilized thereon which catalyzes the reduction reaction of the oxygen supplied from the outside.

The enzyme to be immobilized on the cathode is not specifically restricted so long as it has the oxidase activity which relies on oxygen for the reaction substrate. It includes, for example, laccase, bilirubin oxidase, ascorbic acid oxidase, CueO, and CotA.

The cathode may also have, in addition to the foregoing enzyme, an electron transfer mediator immobilized thereon for smooth transfer of electrons from the anode. The electron transfer mediator to be immobilized on the cathode may be properly selected so long as it has a higher oxidation reduction potential than that used for the anode.

The electron transfer mediator is exemplified as follows.

ABTS (2,2'-azinobis(3-ethylbenzothiazoline-6-sulfonate)), $K_3[Fe(CN)_6]$, $RuO_4^{0/1-}$, $[Os(trpy)_3]^{3+/2+}$, $[Rh(CN)_6]^{3-/4-}$, $[Os(trpy)(dpy)(py)]^{3+/2+}$, $IrCl_6^{2-/3-}$, $[RU(CN)_6]^{3-/4-}$, $OsCl_6^{2-/3-}$, $[OS(py)_2(dpy)_2]^{3+/2+}$, $[Os(dpy)_3]^{3+/2+}$, $Cu^{III/II}(H_2A_3)^{0/1-}$, $[Os(dpy)(py)_4]^{3+/2+}$, $IrBr_6^{2-/3-}$, $[Os(trpy)(py)_3]^{3+/2+}$, $[Mo(CN)_8]^{3-/4-}$, $[Fe(dpy)_3]^{3+/2+}$, $Cu^{III/II}(H_2G_3a)^{0/1-}$, $[Os(4,4'-Me_2dpy)_3]^{3+/2+}$, $[Os(CN)_6]^{3-/4-}$, $RuO_4^{1-/2-}$, $[Co(ox)_3]^{3-/4-}$, $[Os(trpy)(dpy)Cl]^{2+/1+}$, $[W(CN)_8]^{3-/4-}$, $[Os(2-Me-Im)_2(dpy)_2]^{3+/2+}$, ferrocene carboxylic acid, $[Os(Im)_2(dpy)_2]^{3+/2+}$, $[Os(4-Me-Im)_2(dpy)_2]^{3+/2+}$, $OsBr_6^{2-/3-}$, $[Fe(CN)_6]^{3-/4-}$, ferrocene ethanol, $[Os(Im)_2(4,4'-Me_2-dpy)_2]^{3+/2+}$, $[Co(edta)]^{1-/2-}$, $[Co(pdta)]^{1-/2-}$, $[Co(cydta)]^{1-/2-}$, $[Co(phen)_3]^{3+/2+}$, $[OsCl(1-Me-Im)(dpy)_2]^{3+/2+}$, $[OsCl(Im)(dpy)_2]^{3+/2+}$, $[Co(5-Me-phen)_3]^{3+/2+}$, $[Co(trdta)]^{1-/2-}$, $[Ru(NH_3)_5(py)]^{3+/2+}$, $[Co(dpy)_3]^{2+/3+}$, $[Ru(NH_3)_5(4-thmpy)]^{3+/2+}$, $Fe^{3+/2+}$ malonate, $Fe^{3+/2+}$ salycylate, $[Ru(NH_3)_5(4-Me-py)]^{3+/2+}$, $[Co(trpy)_2]^{3+/2+}$, $[Co(4-Me-phen)_3]^{3+/2+}$, $[Co(5-NH_2-phen)_3]^{3+/2+}$, $Co(4,7-(bhm)_2phen)^{3+/2+}$, $[Co(5,6-Me_4-phen)_3]^{3+/2+}$, $trans(N)[Co(gly)_3]^{0/1-}$, $[OsCl(1-Me-Im)(4,4'-Me_2-dpy)_2]^{3+/2+}$, $[OsCl(Im)(4,4'-Me_2-dpy)_2]^{3+/2+}$, $[Fe(edta)]^{1-/2-}$, $[Co(4,7-Me_2-phen)_3]^{3+/2+}$, $[Co(3,4,7,8-Me_4-phen)_3]^{3+/2+}$, $[Co(NH_3)_6]^{3+/2+}$, $[Ru(NH_3)_6]^{3+/2+}$, $Fe(ox)_3]^{3-/4-}$, promazine (n=1) [ammonium form], chloramine-T, TMPDA (N,N,N',N'-tetramethylphenylenediamine), porphyrexide, syringaldazine, o-tolidine, bacteriochlorophyll a, dopamine, 2,5-dihydroxy-1,4-benzoquinone, p-aminodimethylaniline, o-quinone/1,2-hydroxybenzene (catechol), p-aminophenoltetrahydroxy-p-benzoquinone, 2,5-dichloro-p-benzoquinone, 1,4-benzoquinone, diaminodurene, 2,5-dihydroxyphenylacetic acid, 2,6,2'-trichloroindophenol, indophenol, o-toluidine blue, DCPIP (2,6-dichlorophenolindophenol), 2,6-dibromo-indophenol, phenol blue, 3-aminothiazine, 1,2-naphthoquinone-4-sulfonate, 2,6-dimethyl-p-benzoquinone, 2,6-dibromo-2'-methoxy-indophenol, 2,3-dimethoxy-5-methyl-1,4-benzoquinone, 2,5-dimethyl-p-benzoquinone, 1,4-dihydroxy-naphthoic acid, 2,6-dimethyl-indophenol, 5-isopropyl-2-methyl-p-benzoquinone, 1,2-naphthoquinone, 1-naphthol-2-sulfonate indophenol, toluylene blue, TTQ (tryptophan tryptophenylquinone) model (3-methyl-4-(3'-methylindol-2'-yl)indol-6,7-dione), ubiquinone (coenzyme Q), PMS (N-methylphenazinium methosulfate), TPQ (toga quinine or 6-hydroxydopa quinine), PQQ (pyrroloquinolinequinone), thionine, thionine-tetrasulfonate, ascorbic acid, PES (phenazineethosulphate), cresyl blue, 1,4-naphthoquinone, toluidine blue, thiazine blue, gallocyanine, thioindigo disulfonate, methylene blue, vitamine $K_3$, and (2-methyl-1,4-naphthoquinone).

Incidentally, the symbols used in the foregoing formula are defined as follows.

dpy: 2,2'-dipyridine; phen: 1,10-phenanthroline, Tris: tris (hydroxymethyl)aminomethane; trey: 2,2':6',2"-terpyridine; Im: imidazole; py: pyridine; thmpy: 4-(tris(hydroxymethyl) methyl)pyridine; bhm: bis(bis(hydroxymethyl)methyl; G3a: triglycineamide; A3: trialanine; ox: oxalate dianion; edta: ethylenediaminetetraacetate tetraanion; gly: glycinate anion; pdta: propylenediaminetetraacetate tetraanion, trdta: triemthylenediaminetetraacetate tetraanion; and cydta: 1,2-cyclohexanediaminetetraacetate tetraanion.

(iii) Material of the Electrode

The fuel cell according to an embodiment may be identical with related-art ones in the composition of the electrode material and the proton conductor.

The materials of the anode and cathode are not specifically restricted so long as they are capable of electrical connection with the outside. They include, for example, metals (such as Pt, Ag, Au, Ru, Rh, Os, Nb, Mo, In, Ir, Zn, Mn, Fe, Co, Ti, V, Cr, Pd, Re, Ta, W, Zr, Ge, and Hf), alloys (such as alumel, brass, duralmin, bronze, nickel silver, platinum-rhodium, permalloy, permendar, white metal, and phosphor bronze), conductive polymers (such as polyacetylene), carbonaceous materials (such as graphite and carbon black), borides (such as $HfB_2$, $NbB$, $CrB_2$, and $B_4C$), nitrides (such as TiN and ZrN), silicides (such as $VSi_2$, $NbSi_2$, $MoSi_2$, and $TaSi_2$), and composite materials thereof.

The anode and cathode are provided with the anode current collector and cathode current collector, respectively, which supply electrons (released from the anode) to the cathode through the external circuit. They are made of the same material as the electrode.

The above-mentioned enzyme, coenzyme, and electron transfer mediator are immobilized on the electrodes in any known manner. For example, they may be immobilized with the help of an immobilizing carrier (which is a crosslinking agent composed of glutaraldehyde and poly-L-lysine) or a polymer, such as acrylamide, capable of proton conduction.

(3) Proton Conductor

The anode and cathode are arranged with the proton conductor interposed between them. The proton conductor may be selected, without specific restrictions, from a variety of materials which are electrolytes capable of transferring protons (H+) but incapable of transferring electrons.

The electrolyte may be used in combination with a buffering agent which is exemplified as follows.

Dihydrogen phosphate ions ($H_2PO_4^-$) released from sodium dihydrogen phosphate ($NaH_2PO_4$) or potassium dihydrogen phosphate ($KH_2PO_4$), 2-amino-2-hydroxymethyl-1,3-propanediol (Tris), 2-(N-morpholino)ethanesulfonate (MES), cacodylic acid, carbonic acid ($H_2CO_3$), citric acid hydrogen ion, N-(2-acetamide)iminodiacetic acid (ADA), piperazine-N,N'-bis(2-ethanesulfonic acid) (PIPES), N-(2-acetamide)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesufonic acid (HEPPS), N-[tris(hydroxymethyl)methyl]glycine (Tricine), glycylglycine, N,N'-bis(2-hydroxyethyl)glycine (Vicine), and compounds having an imidazole ring, which are listed below.

Imidazole, triazole, pyridine derivatives, bipyridine derivatives, and imidazole derivatives (such as histidine, 1-methylimidazole, 2-methylimidazole, 4-methylimidazole, 2-ethylimidazole, ethyl imidazole-2-carbonate, imidazole-2-carboxyaldehyde, imidazole-4-carbonic acid, imidazole-4,5-dicarbonic acid, imidazol-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole.

An additional example is Nafion, which is a solid electrolyte.

2. Action of Repelling Living Organisms By Essential Oil (1) Plant Essential Oil The fuel cell according to an embodiment has an action of repelling living organisms by plant essential oil. This action prevents insects from swarming over a spill of fuel solution in case of leakage.

The plant essential oil is any organic compound extracted from plants which contains volatile aromatic substances (fragrance). The one used in an embodiment has an action of repelling living organisms including insects and excluding human beings. It may be selected from any known ones disclosed in the patent official gazettes listed below.

Japanese Patent Laid-open No. Hei 10-130114
Japanese Patent Laid-open No. Hei 6-016609
Japanese Patent Laid-open No. Hei 7-048378
Japanese Patent Laid-open No. Hei 9-194318
Japanese Patent Laid-open No. 2001-106609

Typical examples of the plant essential oil are listed below.

Orange flower oil, geranium oil, thyme white oil, thyme red oil, nutmeg oil, patchouli oil, palmarosa oil, bitter orange oil, lemongrass oil, fragrant olive oil, sesame oil, cinnamon leaf oil, cinnamon bark, cassia, celery seed oil, tolubalsam, Peru balsam, oak moss, sandalwood oil, spearmint oil, laurel oil, garlic oil, coconut oil, dill oil (*Anethum graveolens* oil), birch oil, penyroyal oil, Nimes oil, vetiver oil, elemi oil, extract from seeds of *Xylopia aethiopica*, extract from *Wiskstroemia retusa* A. Gray, and extract from seeds of *Aframomum melegueta*.

These plant essential oils contain terpenes, particularly sesquiterpenes such as elemol, β-eudesmol, and vetiselinenol. Among other known examples are cinnamic amide derivatives (and synthetic analogs thereof) isolated from seed extract of *Xylopia aethiopica*, aflatoxin and derivatives thereof isolated from extract of *Wiskstroemia retusa* A. Gray, and ketones (and synthetic analogs thereof) isolated from seed extract of *Aframomum melegueta*.

The above-mentioned plant essential oils may be used alone or in combination with one another. The plant essential oil may be used as such or in the form of pure ingredient.

(2) Addition of Plant Essential Oil To Fuel

The fuel cell is made to produce the action of repelling living organisms by adding the plant essential oil to the fuel solution.

Being volatile, the essential oil produces the effect of repelling insects flying about the fuel cell. Therefore, the fuel solution containing the plant essential oil prevents insects from swarming over its spill in case of leakage. Incidentally, pyrethroids in common use as a related-art insecticide is non-volatile.

Moreover, the plant essential oil is highly safe for human beings. Consequently, the plant essential oil added to the fuel solution produces the insect repelling effect while ensuring the safety for human beings. Incidentally, it has been pointed out that the above-mentioned pyrethroids cause an allergy to chemical substances.

In addition, many of the plant essential oils suppress the proliferation of bacteria and fungi. Therefore, the fuel solution containing the plant essential oil prevents bacteria and fungi from emerging from a spill of the fuel solution. Moreover, having a fragrance, the plant essential oil contained in the fuel solution tells the user about the leakage of the fuel solution which could occur accidentally.

If any substance is to be added to the fuel solution, it should be one which does not impair the activity of the enzyme and coenzyme immobilized on the electrodes and the electron transfer mediator and which does not produce any adverse effect on the oxidation reduction reaction at the electrodes. The plant essential oil is desirable in this respect because it is slightly soluble in the fuel solution and hence it produces no or very little effect on the enzyme activity and fuel cell performance when it is added to the fuel solution (see Examples).

Incidentally, the effect of the plant essential oil on the enzyme activity and the fuel cell performance may be minimized if it is properly selected in consideration of the enzyme immobilized on the electrodes.

Since a small amount of plant essential oil and/or ingredient thereof produces a good effect of repelling insects, the amount of the plant essential oil and/or ingredient thereof to be added to the fuel solution should be 1% or less, preferably 0.1% or less, more preferably 0.01% or less. The amount of the plant essential oil and/or ingredient thereof to be added to the fuel solution should be low enough not to produce any adverse effect on the enzyme activity and the fuel cell performance.

(3) Treatment of Enclosure With Plant Essential Oil

For the fuel cell to have the action of repelling living organisms, it is necessary that the enclosure of the fuel cell be treated, at least partly, with the plant essential oil.

Since the plant essential oil repels insects flying about the fuel cell as mentioned above, it is possible to prevent insects from getting close to the fuel cell if the enclosure of the fuel cell is previously treated with the plant essential oil. The treated enclosure also prevents insects swarming over a spill of the fuel solution in case the fuel solution should leak.

Treatment of the enclosure with the plant essential oil can be accomplished in any manner so long as the plant essential oil produces its effect. A common way of treatment is by application of the plant essential oil onto the surface of the enclosure. Owing to its high safety, the plant essential oil thus applied will be harmless even when it comes into contact with human beings.

Instead of applying the plant essential oil onto the enclosure of the fuel cell, it would be possible to put a member volatilizably impregnated with a small amount of plant essential oil on the surface of the enclosure. Such a member will produce a good effect of repelling insects because of the high effectiveness of the plant essential oil.

Treatment with the plant essential oil may be performed at any place on the enclosure. A desirable place is the supply port for fuel solution where the leakage of fuel solution is liable to occur.

EXAMPLES

Test Example 1

Tests were conducted under the following conditions to investigate how the plant essential oil added to the fuel solution affects the fuel cell performance.

(1) Plant Essential Oil

The plant essential oils used for the test are nutmeg oil, lemongrass oil, and palmarosa oil. The concentration of each plant essential oil in the fuel solution is 1%.

(2) Control Substance

The control substance is N,N-diethyl-m-toluamide (DEET), which is an active ingredient used for most insect repellent sprays. The concentration of DEET in the fuel solution is 1%. Incidentally, the concentration of DEET in the formulation is required to be less than 12% according to the Japanese regulation.

(3) Fuel Solution

The fuel solution is a pH buffer solution composed of 2.0 M imidazole/H2SO4, 0.4 M glucose, and ethanol, pH 7.0.

This solution containing 1% ethanol dissolves 1% DEET completely. The plant essential oil is added to the fuel solution and suspended therein by stirring immediately before current measurement.

(4) Electrode (Anode)

The electrode is one which is made of carbon fiber (1 mm thick). The electrode is coated with an immobilizing agent which is composed of the following ingredients.

A mixture of 1.0 PLL and 0.0625 glutaraldehyde, 75.2 μL
A solution of glucose dehydrogenase (150 mg/mL), 12.4 μL
A solution of diaphorase (150 mg/mL), 1.6 μL
A solution of NADH (40.96 mg/mL), 4 μL
A solution of AQ2S (60 mM), 37.4 μL An enzyme produced by Amano Enzyme Co., Ltd. is immobilized on the above-mentioned immobilizing agent.

The fuel cell supplied with the fuel solution containing the plant essential oil or DEET is examined for current generated by the anode having the enzyme catalyst. The results of measurements are shown in FIGS. 1 to 3.

It is noted from FIG. 1 that the fuel solution incorporated with 1% DEET gives a lower current value than that which is not incorporated with DEET and the decrease in current value is more significant in the early stage of measurement. This result apparently indicates that the addition of DEET to the fuel solution deteriorates the fuel cell performance.

Figure 2:
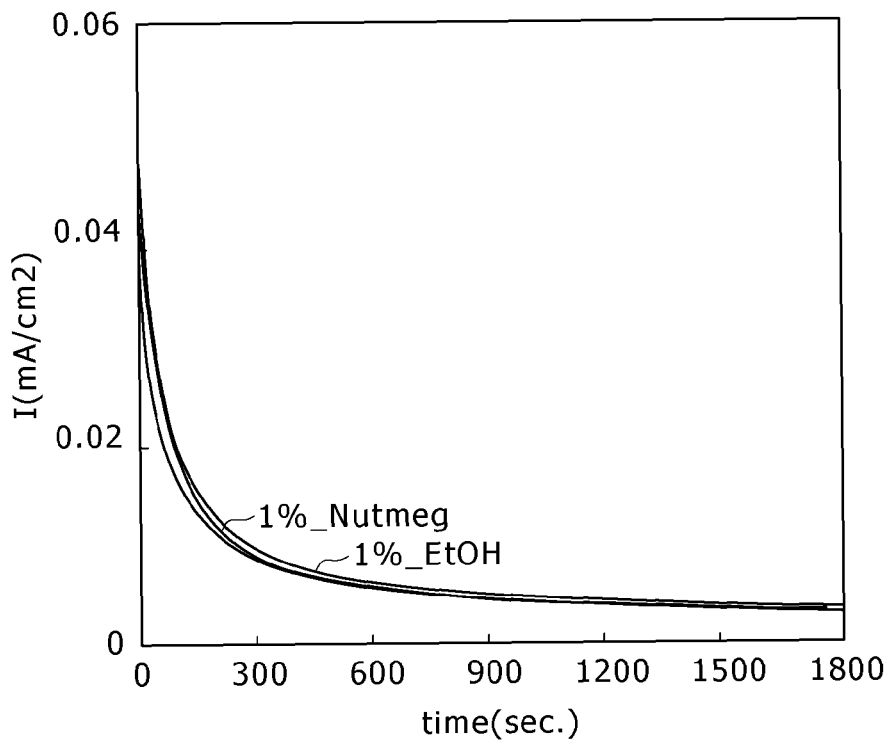
FIG. 2 is a diagram illustrating the result of measurements of the current produced by the enzymatic catalyst at the anode of the fuel cell containing plant essential oil (nutmeg oil)
Figure 3:
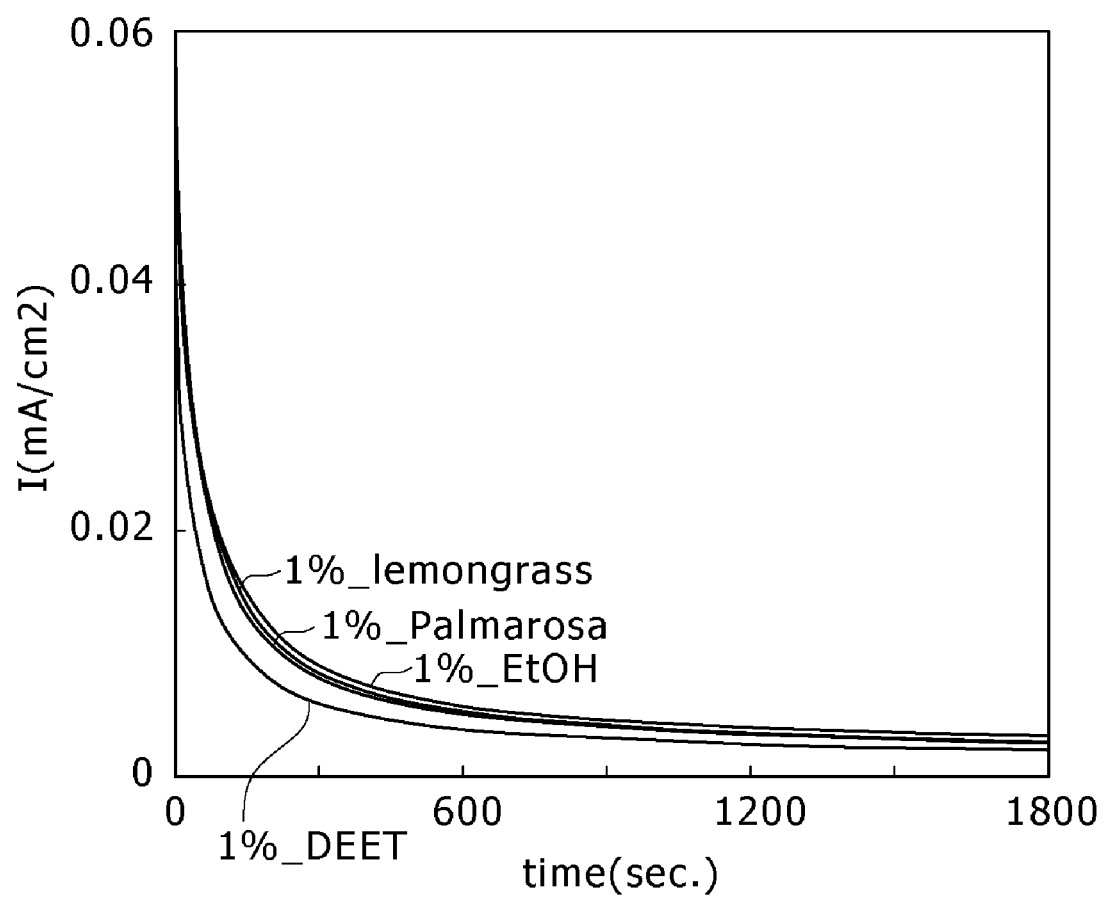
FIG. 3 is a diagram illustrating the result of measurements of the current produced by the enzymatic catalyst at the anode of the fuel cell containing plant essential oil (lemongrass oil or palmarosa oil).

By contrast, it is noted from FIG. 2 that the fuel solution incorporated with 1% nutmeg oil gives the same current value as that which is not incorporated with it. It is also noted from FIG. 3 that the fuel solution incorporated with 1% lemongrass oil or palmarosa oil gives the same current value as that which is not incorporated with it. In other words, addition of lemongrass oil or palmarosa oil to the fuel solution does not decrease the electric current generated by the enzyme catalyst. These results indicate that the plant essential oil added to the fuel solution does not produce adverse effect on the fuel cell performance and proves itself as an adequate insect repellent for the fuel cell.

In the case of fuel solution leakage, the fuel cell according to an embodiment effectively prevents a spill of the fuel solution from attracting insects or growing bacteria and fungi thereon. Moreover, the fuel solution is highly safe for human beings. Therefore, it will be adopted as a power source for familiar electronic machines. It will be suitable particularly for electronic machines vulnerable to the attack by noxious insects, bacteria, and fungi which might pose hygienic problems.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A fuel cell comprising at least one of a plant essential oil and a plant essential oil ingredient in an effective amount so as to function as a biological repellent.

2. The fuel cell according to claim 1, wherein the at least one of the plant essential oil and the plant essential oil ingredient does not produce an adverse effect on enzyme activity and fuel cell performance.

3. The fuel cell according to claim 1, wherein the at least one of the plant essential oil and the plant essential oil ingredient produces higher enzyme activity and fuel cell performance as compared to DEET.

4. The fuel cell according to claim 1, wherein the plant essential oil is selected from the from group consisting of orange flower oil, geranium oil, thyme white oil, thyme red oil, nutmeg oil, patchouli oil, palmarose oil, bitter orange oil, lemongrass oil, fragrant olive oil, sesame oil, cinnamon leaf oil, cinnamon bark, cassia, celery seed oil, tolubalsam, Peru balsam, oak moss, sandalwood oil, spearmint oil, laurel oil, garlic oil, coconut oil, dill oil, Anethum graveolens oil, birch oil, penyroyal oil, Nimes oil, vetiver oil, elemi oil, extract from seeds of *Xylopia aethiopica*, extract from *Wiskstroemia retusa* A. Gray, extract from seeds of *Aframomum melegueta*, and combinations thereof.

5. The fuel cell according to claim 1, wherein the plant essential oil ingredient includes at least one of terpenes including sesquiterpenes including elemol, β-eudesmol, and vetiselinenol; cinnamic amide derivatives isolated from seed extract of *Xylopia aethiopica* and synthetic analogs thereof, aflatoxin and derivatives thereof isolated from extract of *Wiskstroemia retusa* A. Gray, and ketones isolated from seed extract of *Aframomum melegueta* and synthetic analogs thereof.

6. The fuel cell according to claim 1, further comprising a fuel that contains the at least one of the plant essential oil and the plant essential oil ingredient.

7. The fuel cell according to claim 6, wherein the amount of the at least one of the plant essential oil and the plant essential oil ingredient in the fuel is 1% or less.

8. The fuel cell according to claim 6, wherein the fuel includes a biological nutrient source.

9. The fuel cell according to claim 1, wherein the at least one of the plant essential oil and the plant essential oil ingredient is applied to at least a portion of an enclosure of the fuel cell.

10. The fuel cell according to claim 9, further comprising a fuel that includes a biological nutrient source.

\* \* \* \* \*